R. C. NEWHOUSE.
METHOD OF FASTENING.
APPLICATION FILED DEC. 5, 1917.

1,389,154.

Patented Aug. 30, 1921.

Inventor
R. C. Newhouse
by G. J. Ellein
Attorney

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

METHOD OF FASTENING.

1,389,154.  Specification of Letters Patent.  Patented Aug. 30, 1921.

Application filed December 5, 1917. Serial No. 206,103.

*To all whom it may concern:*

Be it known that I, RAY C. NEWHOUSE, a citizen of the United States, residing at Wauwatosa, in the county of Milwaukee and State of Wisconsin, have invented a certain new and useful Method of Fastening, of which the following is a specification.

This invention relates to improvements in means for and a method of fastening together a plurality of elements.

An object of the invention is to provide a simple and efficient method of fastening together a plurality of elements. Another object is to provide simple and efficient means for carrying on the method of fastening.

The invention consists generally in providing a method of fastening together a pair of coacting elements by means of a connecting member having a medial portion closely fitting alined openings in the elements to be connected and provided with relatively adjustable clamping members which are brought into clamping position while the connecting member is heated and which clamping members coöperate with the connecting member to effect fastening upon cooling of the connecting member.

While the invention has been disclosed as specifically applied to fasten together a pair of crusher elements, it is not limited to such application and is capable of application wherever it is desired to rigidly fasten together two or more elements.

A clear conception of an embodiment of the invention may be had by referring to the drawing accompanying and forming a part of this specification in which like reference characters designate the same or similar parts in the various views.

Figure 1:
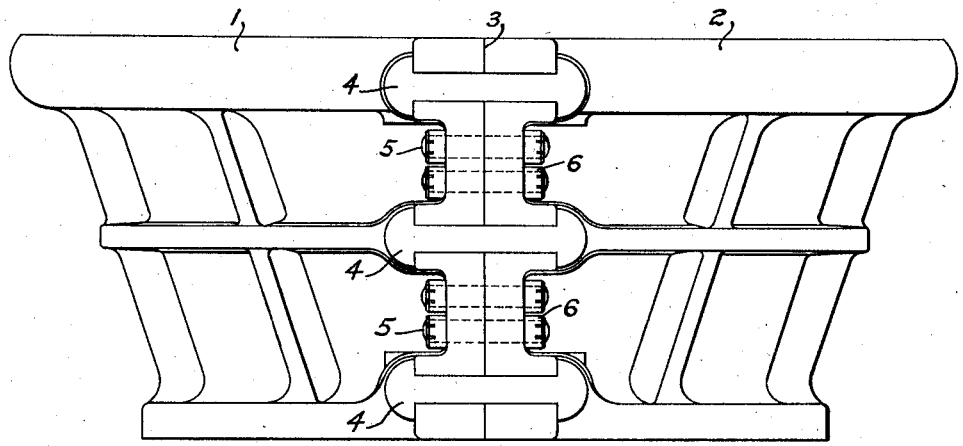
Figure 1 is a side elevation of a two-part gyratory crusher concave, showing the crusher elements fastened together by means of a fastening constructed in accordance with the present invention.
Figure 2:
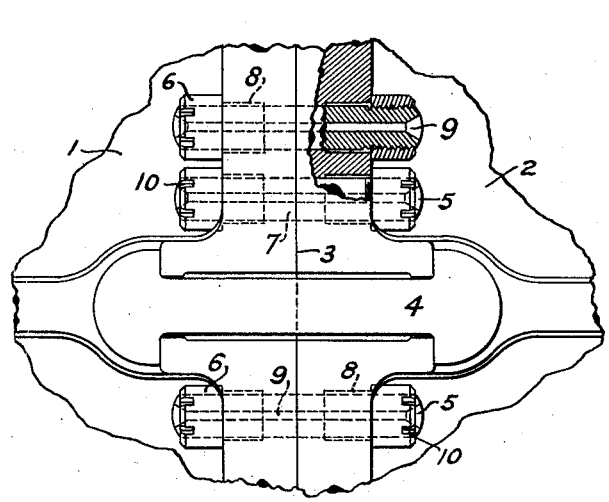
Fig. 2 is an enlarged fragmentary part sectional side view of the several elements to be connected, showing a number of the fastening devices in detail.
Figure 3:
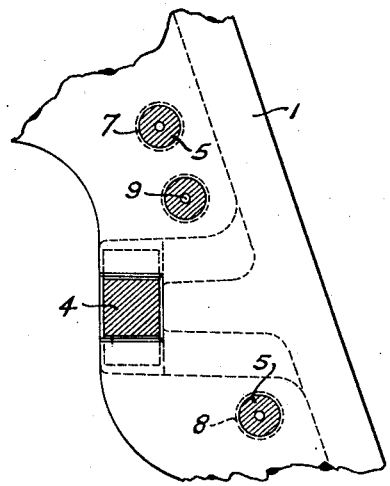
Fig. 3 is an enlarged fragmentary end view of one of the crusher elements showing transverse sections through a number of the fastening devices.

The crusher elements 1, 2 are provided with machined plane surfaces of coaction 3 formed on laterally outwardly projecting adjacent flanges of the elements. These flanges are provided with a number of transverse outwardly open alined recesses within which are located shrink links 4 of the type ordinarily employed to fasten together the segments of a fly wheel. As shown in Figs. 2 and 3 these shrink links 4 have enlarged ends provided with clamping surfaces which coact with adjacent surfaces of the elements 1, 2. The medial portions of the shrink links 4 do not, however, engage the elements 1, 2 so that if no other means were provided, these links 4 in themselves would not be sufficient to positively prevent transverse relative displacement of the crusher elements 1, 2, during operation of the crusher.

In order to positively prevent such transverse displacement of the crusher elements 1, 2 the transverse flanges thereof are provided with a number of through openings which have bored portions 7 closely fitting medial portions of the connecting members or bolts 5 adjacent the surfaces 3, these through openings having other portions 8 of enlarged diameter adjacent the ends of the bolts 5. The bolts 5 are threaded at their protruding opposite ends and are provided with clamping members or nuts 6 having clamping surfaces engageable with surfaces of the lateral flanges of the elements 1, 2. The nuts 6 are cylindrical formation and are provided with manipulating notches 10 within which a wrench may be inserted for the purpose of adjusting the nuts along the bolts. The bolts 5 are hollow being provided with through openings 9 which are preferably slightly enlarged at their outer extremities in order to facilitate injection of a flame.

During fastening of the elements 1, 2, it is preferred to first insert the bolts 5 and to adjust the nuts 6 thereof so as to temporarily hold the elements in proper position for final fastening. After this has been done, the shrink links 4 may be shrunk in place. In order to finally clamp the elements 1, 2, the bolts 5 and the nuts 6 after being properly located relatively to the bores 7 of the through openings, are heated by means of a flame directed against the nuts 6 and injected through the openings 9 of the bolts.

The internal heating of the bolts 5 causes the mid portions thereof to expand laterally and to firmly engage the adjacent bores 7. The end portions of the heated bolts expand longitudinally outwardly away from the rigidly held medial portions, and when thus expanded, the nuts 6 which have expanded laterally with the adjacent bolt ends, are screwed inwardly toward the adjacent surfaces of the element flanges. While adjustment of the nuts 6 is preferably continued until they actually engage the element flanges, this is not necessary. The heated members are then permitted to cool, and to thereby contract. As the bolts contract longitudinally the coacting nuts 6 are drawn toward each other and firmly clamp the elements 1, 2 along the surfaces 3 and fasten them together.

It will be noted that with this method of fastening, the elements 1, 2 after fastening are positively prevented from relative lateral shifting, by the fitted bolts which due to their snug fit in the bores 7 absolutely prevent such shifting. While in most cases the bolts themselves would insure sufficient fastening together of the elements, in the specific case illustrated it is found desirable to provide the shrink links 4 in addition to the bolt fastenings. The fastenings may be readily released by again heating the bolts 5 and nuts 6 by directing a flame against the nuts and through the opening 9, and removing the clamping nuts while the bolts are longitudinally expanded. Upon cooling of the bolts 5 with the nuts removed, the bolts may be driven from within the bores 7.

It should be understood that it is not desired to be limited to the exact steps of the process herein described or to the exact details of the apparatus disclosed, for various modifications within the scope of the claims may occur to a person skilled in the art.

It is claimed and desired to secure by Letters Patent:

1. The method of fastening together a plurality of elements by means of a hollow connecting member having a pair of adjustable clamping surfaces, by immovably associating the connecting member at its medial portion with said elements whereby free expansion of the member away from said medial portion is permitted, heating the interior of the connecting member to cause expansion of the ends thereof away from said medial portion, adjusting the clamping surfaces toward said medial portion while said member is heated, and permitting said member to contract to draw said elements together.

2. The method of fastening together a plurality of elements by means of a connecting member having a pair of adjustable clamping surfaces, by immovably associating the connecting member at its medial portion with both of said elements whereby free expansion of the member away from said medial portion is permitted, heating the connecting member to cause expansion of the ends thereof away from said medial portion, adjusting the clamping surfaces toward said medial portion while said member is heated, and permitting said member to contract to draw said elements together.

In testimony whereof, the signature of the inventor is affixed hereto.

RAY C. NEWHOUSE.